July 24, 1951    G. L. PEARSON    2,562,120
MAGNETIC FIELD STRENGTH METER
Filed Aug. 26, 1948    3 Sheets-Sheet 1

$$E = \frac{RIH}{d}$$

INVENTOR
G. L. PEARSON
BY
Walter M. Hill
ATTORNEY

July 24, 1951     G. L. PEARSON     2,562,120
MAGNETIC FIELD STRENGTH METER
Filed Aug. 26, 1948     3 Sheets-Sheet 2
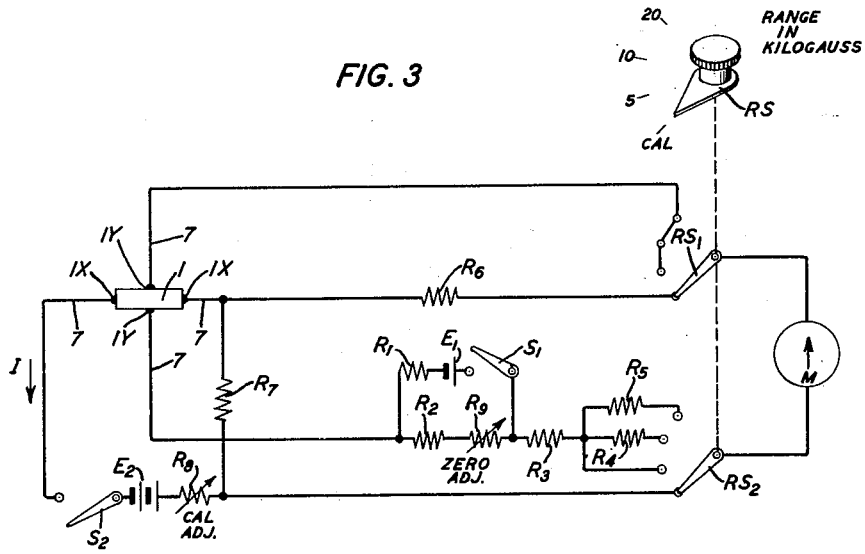
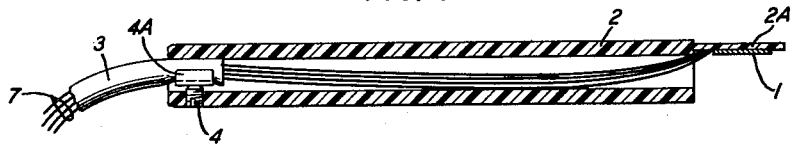
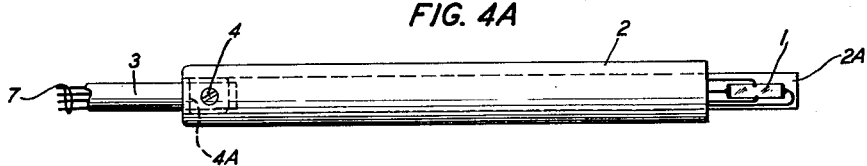
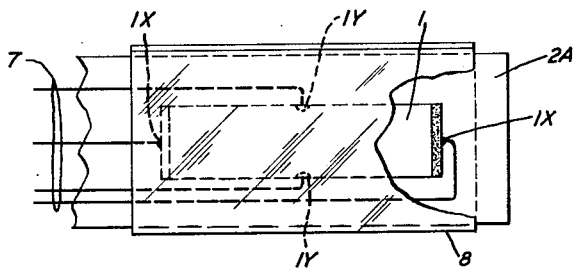
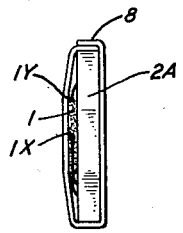
INVENTOR
G. L. PEARSON
BY
Walter M. Thiel
ATTORNEY July 24, 1951  G. L. PEARSON  2,562,120
MAGNETIC FIELD STRENGTH METER
Filed Aug. 26, 1948  3 Sheets-Sheet 3

INVENTOR
G. L. PEARSON
BY Walter M. Hill
ATTORNEY

Patented July 24, 1951

2,562,120

UNITED STATES PATENT OFFICE 2,562,120

MAGNETIC FIELD STRENGTH METER

Gerald L. Pearson, Millington, N. J., assignor to Bell Telephone Laboratories, Incorporated, New York, N. Y., a corporation of New York Application August 26, 1948, Serial No. 46,259

8 Claims. (Cl. 175—183)

This invention relates to the art of measuring magnetic field strength and more particularly to an apparatus embodying the Hall effect for measuring such fields as well as a method of making a probe structure therefor.

The Hall effect, so named because of the discovery thereof by E. H. Hall in 1879, has been well known for many years. Hall's experimental work is described in the November 1880 issue cf Philosophical Magazine, page 301. While the voltage generated, which is the effect produced, was known to be proportional to the strength of the magnetic field acting on the conductive strip, it did not appear, prior to this invention, that this effect could be utilized in any practical or convenient way to measure magnetic field strength. This was largely due to the low Hall coefficient realized from most materials investigated which necessitated rather bulky apparatus to detect the Hall voltages. Recently, measurements of the Hall coefficient and the specific resistance of germanium have been investigated and a consideration of the data observed therefrom has led to the conception of this invention. In the past, the simplest means for measuring magnetic field strength has been a search coil and ballistic galvanometer or a bismuth spiral. The advantage of the bismuth spiral is that it enables one to take continuous static readings of field strength without displacing the probing element as is necessary when the ballistic method is employed.

Several disadvantages and difficulties have constantly faced those who have found it necessary to take large numbers of field strength readings, particularly in narrow air gaps in magnetic circuits. Among these are the bulk, cumbersomeness and lack of portability of the apparatus required, the relatively large size of the probe element or search coil which must be used, the difficulty of accurately locating the probe element when exploring specific areas of the magnetic field, the practical difficulty of withdrawing a search coil without injury after having placed it in a relatively narrow gap approximating its own thickness, the practical impossibility of making search coils sufficiently small to use in the very narrow air gaps used in much of the modern apparatus and the relatively long time required to take each reading.

It is the object of this invention to overcome the aforesaid disadvantages and difficulties by providing an extremely simple, light-weight, portable and continuous reading magnetic field strength meter capable of measuring and giving direct readings of magnetic field strength in most any location and especially in very narrow air gaps in magnetic circuits.

The foregoing object is attained by this invention which provides a portable magnetic field strength meter comprising a flat strip of crystalline germanium exhibiting the Hall effect to a marked degree. The current axis carries a direct current of predetermined magnitude while the terminals on the Hall axis are connected directly to a D'Arsonval type galvanometer or its equivalent. The germanium strip is mounted on a small probe for conveniently exploring magnetic fields. The invention also provides a new probe construction for supporting the crystalline germanium strip as well as a method of constructing it.

The invention may be better understood by referring to the accompanying drawings, in which.

Figure 6:
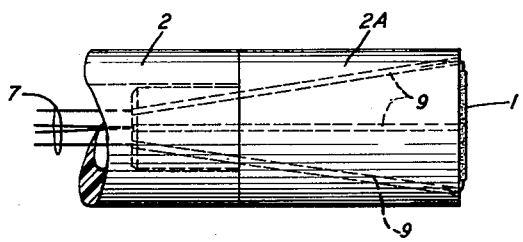
Figure 6A:
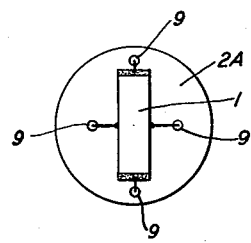
Figure 7:
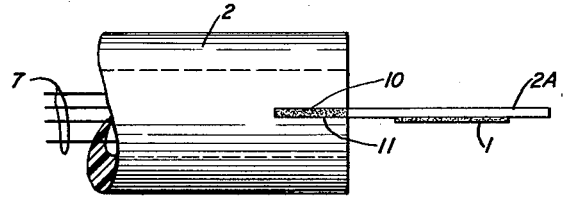
Figure 7A:
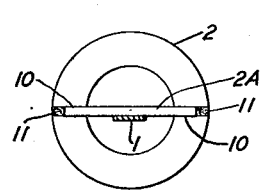
Figure 7B:
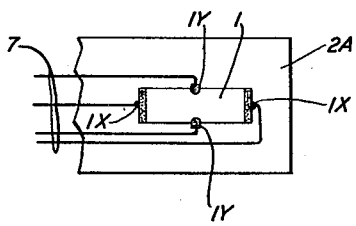
Figure 8:
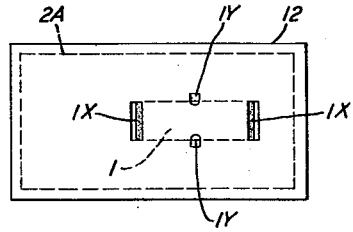
Figure 9:
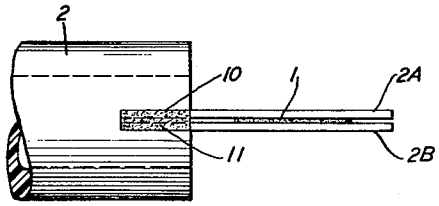
Figure 10:
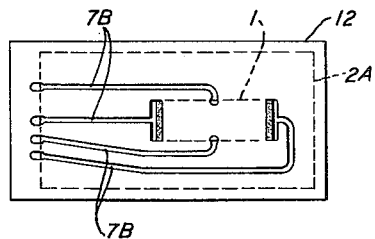
Figure 11:
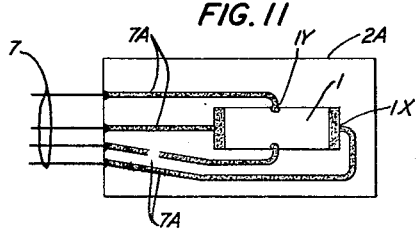

Fig. 3 discloses a preferred circuit diagram of an embodiment of this invention;

Figs 4 and 4A show two views of a preferred form of probe structure;

Figs. 5 and 5A disclose enlarged views of the construction of the probe element of Figs. 4 and 4A;

Figs. 6 and 6A disclose two views of a different arrangement of the probe element;

Figs. 7, 7A and 7B disclose three views of a still different probe structure in which the crystalline germanium has been deposited on a fused quartz support by vaporization in a vacuum;

Fig. 8 discloses one form of mask which may be placed over the deposited crystalline germanium prior to evaporating gold terminals on the germanium strip of Fig. 7B;

Fig. 9 discloses a modification of Fig. 7 in which the germanium crystal is placed between two thin fused quartz plates to protect the germanium element;

Fig. 10 shows a different form of mask in which openings provide for evaporating conducting leads simultaneously with the formation of the terminals; and Fig. 11 shows a probe element with conducting leads formed by the mask of Fig. 10.

Referring again to Fig. 1, the crystalline germanium Hall element is designated by reference numeral 1 and is shown mounted at the end of a rod-like probe support 2 which may be of most any non-magnetic material but is preferably of an insulating material such as a length of Lucite tubing. A cable sheath 3 is provided for protecting the conductors (not shown in this figure) which are used for connecting the crystalline germanium element 1 to the measuring circuit. This cable sheath is secured to the probe handle 2 by means of a suitable clamping device such as set screw 4. The other end of cable sheath 3, containing the conductors, is attached by means of a suitable connector 5 to a jack in box 6. Box 6 contains the electrical measuring circuit to be more particularly described later in connection with Fig. 3. While the shape of box 6 may take on any form, the arrangement shown in Fig. 1 has been found very convenient and is preferred for a portable structure.

Figure 1:
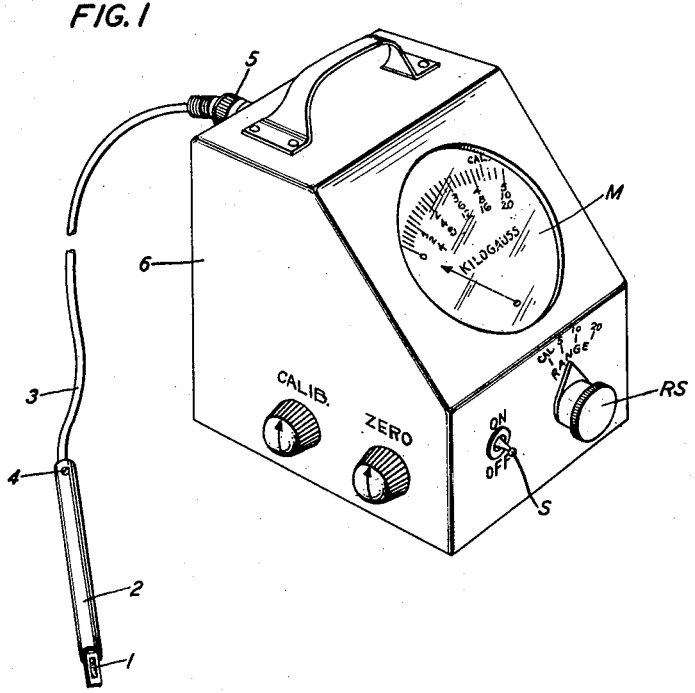
Fig. 1 is a perspective showing of a complete apparatus embodying this invention and clearly disclosing the extreme portability of which it is capable.

It will be noted that the box 6 of Fig. 1 is provided with a suitable handle at the top for carrying the equipment about while making measurements. On the sloping panel is mounted a meter M which is used for observing the readings of the apparatus. On the front vertical portion of the box is found a switch S for turning the power on and off. Also on this same portion of the box is found a range switch RS which adjusts the meter M to different ranges of sensitivity depending upon the strength of the field being measured. On the left end of the box is found two control knobs, one for adjusting the calibration of the apparatus and the other for setting the meter M to zero. The purpose and the use of these adjustments will be described in greater detail later.

Cable 3 may be of any desired and convenient length but it has been found that a length of from three to five feet is adequate for nearly all measurements which are ordinarily made with this equipment. It is easily seen from Fig. 1 that this apparatus is extremely portable, the box 6 itself being of small size and easily contained in a space represented by approximately a six inch cube, the actual dimensions varying with the individual designer. The equipment as shown is completely self-contained including power sources and the total weight is under six pounds.

Figure 2:
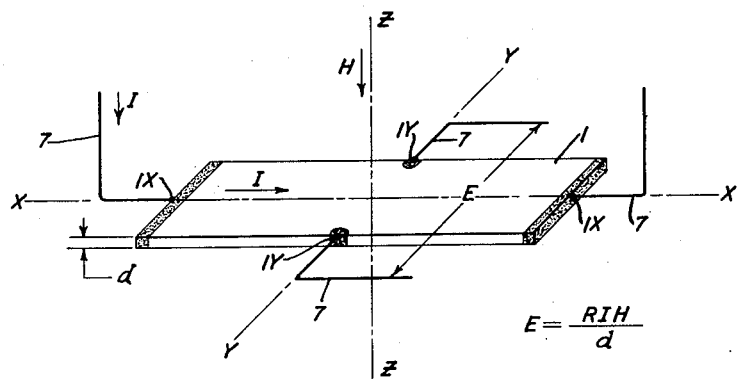
Fig. 2 is an enlarged view of a probe element embodying the Hall effect employed in this invention.

While, as previously indicated, the Hall effect itself and its theory have been well known for many years, a brief description of the phenomenon may aid in a better understanding of this invention. In Fig. 2 is shown an enlarged perspective view of a Hall effect element. The reference numeral 1 denotes the thin strip of electrical conductive material which exhibits this phenomenon. According to theory, the Hall effect occurs because the magnetic field causes the electrons flowing in this element to travel in curved paths, thus charging up the sides of the conductor until a transverse electric field exists of just the right magnitude to cancel the effect of the magnetic field and make the electrons travel through the strip undeviated. In the figure, the axis X—X may be denoted the current axis through which a current of intensity I may be caused to flow, the direction of which may be from left to right as indicated by the arrow in Fig. 2. The strip 1 should have a thickness $d$ which is relatively small compared with its other dimensions. If it is assumed that the strip 1 lies in the X—Y plane as shown by the X and Y coordinate axes in Fig. 2, the magnetic field H is applied in a direction parallel with the Z axis and a current I is caused to flow in the positive direction through the strip 1, parallel with the X axis, the electromotive force E existing across the voltage terminals 1Y—1Y will be of a magnitude proportional to the product of the current I and the field strength H and inversely proportional to the thickness $d$. The axis of the 1Y—1Y terminals should be perpendicular to the current axis X. The polarity of the voltage will be dependent upon the material of which strip 1 is composed. For the purposes of this invention, it is immaterial what this polarity is as it will always remain consistently the same for a given material. Mathematically this relationship is expressed as follows:

$$E = \frac{RIH}{d} \quad (1)$$

E = volts across Hall terminals 1Y—1Y
I = amperes flowing between current terminals 1X—1X
H = magnetic field intensity in gauss
$d$ = thickness of element in centimeters
R = Hall coefficient in volt-centimeters per ampere-gauss The semiconductor material, germanium, is particularly suited for detecting Hall voltages since it has a remarkably large Hall coefficient associated with a favorable ratio of Hall voltage to specific resistance. It is important that this latter ratio be relatively large for a given size of probe element in order that this voltage may be used to operate the indicating galvanometer directly without the use of any amplification. Of course amplification could be used but when it is used it not only introduces additional bulk but has the disadvantages of the inherent instability of direct current amplifiers and considerable added complications both in the circuit construction as well as in the operation and use of the equipment. It is especially emphasized that the germanium to be used for this probe element should be of the crystalline form. Germanium is also known to exist in the amorphous form but in this allotropic form, it exhibits very little Hall effect. To illustrate the favorable properties of crystalline germanium, it is compared with three other materials exhibiting the Hall effect in Table I below. In this table, crystalline germanium is compared with bismuth, tellurium and copper as listed in the first column. In the second column is given the Hall coefficient R in volt-centimeters per ampere-gauss and the third column is the resistivity $\rho$ of these materials in ohm-centimeters.

*Table I*

| Material | Hall Coefficient (R) | Resistivity ($\rho$) ohm-centimeters |
| --- | --- | --- |
| Germanium | $8(10)^{-2}$ | 5.7. |
| Bismuth | $1(10)^{-8}$ | $1.1(10)^{-4}$. |
| Tellurium | $5.3(10)^{-7}$ | 0.2. |
| Copper | $5.2(10)^{-13}$ | $1.7(10)^{-4}$. |

From Table I above, it will be evident that the Hall coefficient for germanium is much larger than that for any of the other three materials listed. The next largest Hall coefficient is given for tellurium. Crystalline germanium however has a Hall coefficient of about 150 times as large as that for tellurium and it is about 8,000 times as large as the Hall coefficient for bismuth and about 150,000,000 times more than the coefficient for copper. If a metal such as bismuth or copper is selected for the Hall element, the meter would have to have such a low resistance that it would be impossible to construct it in any practical way. The most sensitive meters of the D'Arsonval type have relatively high resistances. This means that the Hall element may have a relatively high resistance and should also have as high a Hall coefficient as is possible. These considerations point toward some semiconductor rather than a material usually classed as a conductor, provided the semiconductor has a large Hall coefficient. Crystalline germanium meets these requirements and therefore excels the other materials as an element to be used with a direct indicating instrument of the type embodied in this invention.

The well-known fact that the Hall voltage E developed across the Y—Y axis of Fig. 2 will reverse in polarity upon the reversal of either the direction of the field H or the direction of current flow of current I, makes it possible for the instrument to indicate not only the magnitude of the field but also its direction. If the direction of the current is fixed, one side of the probe element may be given a distinctive color, as for example a red dot, which indicates that for a positive deflection of the galvanometer this surface is facing the north magnetic pole of the field being measured.

In most conductor materials such as copper and bismuth, the connections of the current terminals IX—IX as shown in Fig. 2, is made directly to the metal itself. However, in the case of crystalline germanium, which is actually a semiconductor, it is better to plate the terminals on the ends of the strip I with a metallic conductor (for example, gold) as shown by the shaded portions at terminals IX—IX. The conductors 7 are then attached to these terminals by soldering, by the use of silver paste or by simply using spring contacts, all of which are customarily used for such purposes. It may also be stated that it is not essential that the shape of the crystalline germanium strip be strictly rectangular although this has been found a very convenient shape. It is, however, preferable that the current axis be somewhat longer than the voltage axis, that is, the length of the element along the X—X axis of Fig. 2 is greater than the length along the Y—Y axis. This assures a more uniform electron flow through the strip and is also the reason for plating the full length of the ends of the strip as shown by the shaded portions in Fig. 2.

A preferred circuit structure is shown in Fig. 3 wherein the probe element I is shown schematically having its current terminals IX—IX and the voltage terminals IY—IY corresponding with the same designations in Fig. 2. Current I is supplied from a source of direct voltage $E_2$. When switch $S_2$ is closed, current flows from the source $E_2$ through the calibrating adjusting rheostat $R_8$ and the meter shunt resistor $R_7$ through the germanium strip I by way of its terminals IX—IX and back to the battery through the switch $S_2$. The magnitude of this current is adjusted by adjusting rheostat $R_8$. The manner in which this adjustment is made will be described in greater detail later. The range switch RS is shown in the calibrate (CAL) position such that switch banks $RS_1$ and $RS_2$ are connected to their lower contacts, whereby meter M is directly connected across the meter shunt resistor $R_7$ through a series resistor $R_6$. The meter M may be of most any of the commercially available D'Arsonval type galvanometers but is preferably of a type known as the model 301 Weston direct current microammeter with a range of 20 microamperes. Its scale may be specially calibrated to read field strength in kilogauss rather than in microamperes. With this meter, $R_6$ may have a resistance of the order of 13,500 ohms, while the meter shunt resistor $R_7$ may have a resistance of the order of 15 ohms. If the voltage of source $E_2$ is 4½ volts, the calibration rheostat $R_8$ may be of the order of 200 ohms maximum.

The Hall voltage E as discussed in connection with Fig. 2, is derived from the terminals IY—IY and is applied directly to the meter M through suitable multiplier resistances $R_3$, $R_4$ and $R_5$ depending upon the range of field intensity being measured. The different ranges are obviously selected by simply moving the range switch RS to the desired range, as for example, 5, 10 or 20 kilogauss. Due to the remarkably large Hall coefficient of crystalline germanium and the very favorable ratio of Hall voltage to specific resistance, this Hall voltage may be measured directly by the microammeter in the manner indicated in Fig. 3 and without the interposition of any amplification.

Also in Fig. 3, it will be noted that there is a second source of direct voltage $E_1$ which may be connected to a network of resistances $R_1$, $R_2$ and $R_9$ through a switch $S_1$. It will be remembered that in connection with the description of Fig. 2, the Hall voltage terminals IY—IY should be exactly perpendicular with the current axis X—X. Theoretically, this relationship should be rigorously maintained. Practically, however, it is impossible to construct such a small element in this manner and the voltage axis will invariably be other than 90 degrees either one way or the other. This will produce a false voltage across the Hall voltage terminals of element I, the polarity of which will depend upon the actual displacement of the voltage axis from its correct perpendicular position. Because of this misalignment, the meter will indicate a deflection in a zero field and in order to bring the meter back to zero, it is necessary to balance out this false voltage.

The network comprising voltage source $E_1$ and resistors $R_1$, $R_2$ and $R_9$ balance out this false voltage by directly opposing it. The connection of voltage source $E_1$ to the network is determined by the polarity of the false voltage and must be determined for each probe that is used with the apparatus. It has been found that if voltage source $E_1$ is of 1½ volts that resistor $R_1$ may be of the order of 300 ohms, resistor $R_2$ of the order of 5 ohms and variable resistor $R_9$ of the order of 10 ohms maximum. These values may have to be changed slightly depending upon the probe used and its degree of misalignment. Switches $S_1$ and $S_2$ are preferably ganged together to be operated by the single switch lever S as shown in Fig. 1. This, of course, is not essential and these switches may be separate, if desired. Alternatively, switch $S_1$, if separate from switch $S_2$, may be of the double-pole reversing type and may be so connected with the direct voltage source $E_1$ as to reverse its polarity in the network $R_1$, $R_2$ and $R_9$. This is not specifically shown in Fig. 3 but such a connection is obvious to anyone skilled in the art. This latter arrangement would be convenient only in the event the apparatus is being used with a variety of different probes, some of which have misalignment in one direction and some in the other.

In operation, the switches $S_1$ and $S_2$ are closed and the range switch RS is set on its calibrating position. The calibrating adjustment rheostat $R_8$ is then adjusted until the meter M reads a predetermined amount of current I. This current may be an arbitrary amount and it is preferable that it be indicated by a single index marked "CAL" placed on the scale of meter M. The actual magnitude of this current is relatively unimportant. It is only essential that it be maintained constant and at the same value it had during calibration. With the probe element 1 in a negligibly small magnetic field, the range switch RS is placed on one of the measuring ranges, preferably the most sensiitve one, and the zero adjustment rheostat $R_9$ adjusted until the meter M reads zero. This latter adjustment, of course, balances out any appreciable difference in potential drop between the Hall terminals due to misalignment of their axis with the current axis. Now assuming that the resistances of multiplier resistors $R_3$, $R_4$ and $R_5$ have been previously correctly selected to give correct meter indications for known magnetic fields, the instrument is ready for measuring the intensity of any known magnetic field within its range. This is accomplished by merely holding the probe support 2 of Fig. 1 in such a manner that the plane of the probe element 1 is perpendicular to the direction of the field to be measured. If the probe is not oriented properly the meter M will deflect backwards, but by simply reversing the probe element 1 so that the red dot faces in the direction of the north pole of the magnetic field to be measured, a positive deflection of meter M will be observed. This will indicate directly the strength of the magnetic field in which the element is immersed.

The probe structure may take on a variety of forms but a preferred form is shown in Figs. 4 and 4A. In Fig. 4 the probe is shown in cross-section, the handle portion 2 being preferably of tubular form and of a material such as Lucite. The probe support itself 2A may be integral with the tubular handle portion 2 and may be formed by simply machining one end of the tubular handle 2 as shown in Figs. 4 and 4A. Support 2A will then have two substantially parallel surfaces and may have a thickness of, for example, from 0.020 to 0.040 of an inch, depending upon the application to be made of the probe.

The cable sheath 3 containing four conductors 7 with the probe element 1 connected thereto may be pulled through the tubular handle 2 so that the probe element 1 may be cemented or otherwise secured to the inside plane surface of support 2A as shown more clearly in Fig. 4A. The cable sheath 3 is then secured in place by means of a set screw 4 which is preferably caused to act through a clamping plate 4A which consists of simply a small piece of metal which distributes the force produced from the set screw over a larger area of the cable sheath 3. Most any other means of anchoring the cable sheath to the handle 2 to prevent injury to the conductors and the probe element 1 may be employed but this method has been found quite satisfactory and is preferred because of its simplicity.

In the type of construction shown in Fig. 4, the germanium element is cut from a mass of the crystalline germanium by means of a diamond saw and subsequently ground with carborundum powder to the proper dimensions. For use in small gaps, slabs as thin as 0.004 inch have been prepared although the usual probe is 0.040 inch thick. Its length may be about ½ inch and its width slightly under a quarter of an inch. Copper lead wires may be applied by soldering directly to the germanium element or to gold terminals on the element. As previously mentioned, this connection may also be made by means of silver paste. The strip 1 may be secured to its support 2A by means of most any insulating cement or by tape.

An enlarged view of the support 2A is shown in Figs. 5 and 5A. Fig. 5 shows an enlarged view of this portion of Fig. 4A. The germanium element 1 is secured to its support 2A by means of a strip of adhesive tape commonly known as Scotch cellulose tape. The tape is simply wrapped about the element 1 and its support 2A in the manner shown in Figs. 5 and 5A. In Fig. 5A, which is an end view of Fig. 5, the manner in which this tape 8 is wrapped about these two parts is more clearly shown.

At times it may be preferable to have the plane of the germanium element perpendicular with the long axis of the tubular handle 2 as shown in Fig. 6. In this figure the support 2A is shown separable from the tubular handle 2 and the germanium element 1 is attached to the extreme outer end. One convenient method of making such a mount is simply to machine one end of a Lucite rod to a diameter to just fit snugly in the hole in the tubular handle 2. Four holes 9 are drilled from the outer face through the end of the reduced section as shown in Fig. 6A. These holes are to furnish conduits for the four wires 7 which are to be connected to the four terminals of the germanium element 1. After the connections are made the element 1 may be cemented to the support 2A with any insulating cement or, if desired, may be covered over and attached to the support 2A by means of Scotch cellulose tape.

Fig. 7 discloses a still further modification of the probe structure. In this figure the probe element 1 is deposited by vaporization on a thin plate of fused quartz which provides the support 2A. The thickness of this deposit may be very small, for example, it may be in the order of $10^{-4}$ centimeters. The thickness of the fused quartz support may vary from 0.0025 inch to 0.040 inch or more. It is obvious that such a construction will enable one to use this probe in very narrow gaps. The manner of making this deposit and connecting the wires 7 to the element will be described in greater detail further on in this specification. It will be noted from Figs. 7 and 7A that the fused quartz support 2A is inserted into a slot 10 at the end of the tubular handle 2. The probe element 1 is deposited near one end of the support 2A so that the other end is available for insertion in this slot 10. After inserting in the slot it may be secured in place by means of some cement 11 as shown in both Figs. 7 and 7A.

Fig. 7B is a front view of the probe element 1 mounted on its fused quartz support 2A and showing the connections of the wires 7 to the electrodes of the probe element. In order to keep the thickness of the connecting wires more nearly in the order of the thickness of the probe element 1, the connections over the fused quartz plate may be of gold leaf cemented to the terminals by means of silver paste or other conducting cement.

While the vaporization of metals on various surfaces is a process well known in the art, a few comments with regard to the vaporization of this particular material for this purpose are in order. The vaporization process must take place in a vacuum. The germanium may be held in a vessel commonly called a "boat," made of a material which is chemically inert to germanium at a temperature approximating the melting point of germanium. This "boat" should have a melting point materially higher than the melting point of germanium. Tantalum has been found ideal for this purpose, although tungsten and other materials, inert to germanium at the temperature indicated, can be used. The surface of the fused quartz plate to be coated by the germanium is placed over the vessel in the usual way. The quartz plate should be preheated to a temperature slightly above 400° C., but at a temperature below that of the vessel containing the germanium. The germanium is then heated to a temperature above its melting point but below the reaction temperature of the germanium and its vessel. The preferred temperatures are about 600° C. for the quartz plate and about 1000° C., which is slightly above the melting point of germanium, for the germanium and its tantalum vessel. The quartz plate must be preheated as indicated in order to get a deposit of crystalline germanium. If the quartz plate were cold, the deposit would be of the amorphous form, rather than crystalline, which would have no substantial Hall effect.

The rate at which the deposit takes place is dependent somewhat upon the degree of vacuum achieved and it has been found that a vacuum of the order of $10^{-6}$ millimeters of mercury is satisfactory. When the required amount of crystalline germanium has been deposited on the quartz plate, the quartz plate is removed from the vacuum chamber and permitted to cool.

It is not essential that special high conductivity terminals be placed on the germanium in order to make it operate as a Hall element. However, by placing such terminals on the germanium, it reduces the resistance through the element.

When the deposited germanium and its quartz support has cooled sufficiently, which should be around room temperature, a mask shown in Fig. 8, is placed over it, exposing only the portions which are to be covered with the high conductivity terminal material. Gold is preferred for the terminal material, although other conducting materials can be used. The quartz support with its crystalline germanium deposit covered by the mask is now placed in the vacuum chamber facing a vessel containing gold. The gold is heated to a temperature slightly above its melting point and by reason of the fact that the quartz and the germanium deposit are now cold there will be no reaction between the germanium and the gold. The gold deposit however will be formed on the crystalline germanium element 1 and on the quartz plate 2A through the apertures of the mask 12 as shown in Fig. 8, thereby forming the gold terminals at the required points. Connections are made to these gold terminals after the gold evaporation process is completed and the mask is removed.

If it is desired to give the crystalline germanium element additional protection, a second fused quartz plate such as plate 2B shown in Fig. 9 may be placed on the opposite side of the deposit thereby forming a "sandwich" with the deposit lying between the two quartz plates 2A and 2B. This assembly is inserted in the slot in the end of the handle 2 and cemented in place in the manner previously described for Fig. 7. Cement may also be placed along the edges between the plates 2A and 2B.

An alternative method of making the connection to the terminals is shown in Figs. 10 and 11. In Fig. 10 the mask 12 is modified to the extent that a series of apertures 7B extend from the four terminals to the left edge of the quartz support 2A. When the gold deposit is made by vaporization, these apertures admit a gold deposit to the quartz plate 2A so as to form connections between the terminals to the left edge of the quartz plate. The connecting wires 7 are then connected by soldering or silver paste to the gold deposit at the left edge of the plate rather than directly on the element 1 itself. These conducting deposits 7A are shown in Fig. 11 where the mask has been removed showing the connecting paths from the terminals of the germanium crystal 1 to the left edge of the supporting plate 2A. The advantage of this method over the prior method is that the connection to the germanium crystal is made at the same time the gold terminals are formed on the crystal in the evaporation process and the thickness of the conducting path 7A is not materially greater than that of the crystal itself. This aids in maintaining a minimum thickness for the over-all structure which is quite necessary when using the probe in small gaps and avoids any injury to the element when the connections are made to the conductors 7.

For a technical discussion of this instrument including its limits of accuracy and sources of error, reference may be made to a publication in the Review of Scientific Instruments, vol. 19, No. 4; April 1948, page 263, the article entitled "A Magnetic Field Strength Meter Employing the Hall Effect in Germanium."

From the foregoing description it is apparent that not only a very convenient, practical, portable and novel magnetic field measuring apparatus has been described, but a novel probe structure has also been described as well as a method of making a preferred form thereof which is especially adapted for use in very narrow air gaps.

What is claimed is:

1. In an apparatus embodying the Hall effect for measuring magnetic field strength, a probe structure therefor comprising a flat strip of crystalline germanium, the thickness of which is small compared to its other dimensions, a pair of terminals on said strip disposed at opposite thin edges thereof, the line passing through said terminals defining one axis of the strip, a second pair of terminals also disposed at opposite thin edges of the strip, the line passing through said second pair of terminals defining a second axis substantially at right angles to said first axis, a support for said strip comprising an electrical insulator having a plane surface at least as large as said strip, means comprising an electrical insulating material for securing said strip to the plane surface of said support, and a handle attached to or integral with said insulator whereby the probe may be conveniently moved about in a magnetic field to be measured.

2. The combination of claim 1 and two pairs of electrical conductors extending along the length of said handle, and means connecting the conductors to the two pairs of terminals on said strip.

3. In an apparatus embodying the Hall effect for measuring magnetic field strength, a probe structure therefor comprising an electrical insulating support of fused quartz having a flat surface area, a layer of evaporated crystalline germanium deposited on and adhering to a portion of said flat surface, the thickness of said layer being small compared to its other dimensions, a pair of terminals on said layer disposed at opposite thin edges thereof, the line passing through said terminals defining one axis of the layer, and a second pair of terminals also disposed at opposite thin edges of the layer, the line passing through said second pair of terminals defining a second axis substantially at right angles to said first axis.

4. The combination of claim 3 wherein said two pairs of terminals are evaporated gold layers deposited directly on said germanium layer.

5. The combination of claim 3 and a handle attached to or integral with said support whereby the probe may be conveniently moved about in a magnetic field to be measured.

6. The combination of claim 3 and a protective covering of electrically insulating material attached to said fused quartz support and including said layer between the covering and the quartz support.

7. An apparatus embodying the Hall effect for measuring magnetic field strength comprising a flat strip of crystalline germanium, the thickness of which is small compared with its other dimensions, a pair of terminals on said strip disposed at opposite thin edges thereof, the line passing through said terminals defining one axis of the strip, a second pair of terminals also disposed at opposite thin edges of the strip, the line passing through said second pair of terminals defining a second axis substantially at right angles to said first axis, a source of direct current and connections forming a circuit from said source to one pair of said terminals, means for controlling the magnitude of the current flowing in said circuit, a direct-current indicator connected to the other pair of terminals, a probe means for supporting said strip and for inserting it in a magnetic field to be measured, and a potential balancing means connected in circuit with said indicator for nullifying any electromotive force due to misalignment of the right angular relationship between the said two axes.

8. An apparatus embodying the Hall effect for measuring magnetic field strength comprising a flat strip of crystalline germanium, the thickness of which is small compared with its other dimensions, a pair of terminals on said strip disposed at opposite thin edges thereof, the line passing through said terminals defining one axis of the strip, a second pair of terminals also disposed at opposite thin edges of the strip, the line passing through said second pair of terminals defining a second axis substantially at right angles to said first axis, a source of direct current and connections forming a circuit from said source to one pair of said terminals, means for controlling the magnitude of the current flowing in said circuit, a direct-current indicator connected to the other pair of terminals, a probe means for supporting said strip and for inserting it in a magnetic field to be measured, and a potential balancing means connected in circuit with said indicator for nullifying any electromotive force due to misalignment of the right angular relationship between the said two axes, said balancing means comprising an adjustable source of direct voltage the polarity of which is connected in opposition to the electromotive force due to said misalignment.

GERALD L. PEARSON.

REFERENCES CITED

The following references are of record in the file of this patent:

UNITED STATES PATENTS

| Number | Name | Date |
| --- | --- | --- |
| 1,825,855 | Craig | Oct. 6, 1931 |
| 1,900,018 | Lilienfeld | Mar. 7, 1933 |
| 1,998,952 | Edgar et al. | Apr. 23, 1935 |
| 2,291,692 | Cloud | Aug. 4, 1942 |
| 2,426,377 | Smith | Aug. 26, 1947 |
| 2,459,174 | McFarland et al. | Jan. 18, 1949 |
| 2,464,807 | Hansen | Mar. 22, 1949 |
| 2,474,693 | Rowe | June 28, 1949 |